INVENTOR.
WILLIAM MUNZ
BY
ATTORNEYS

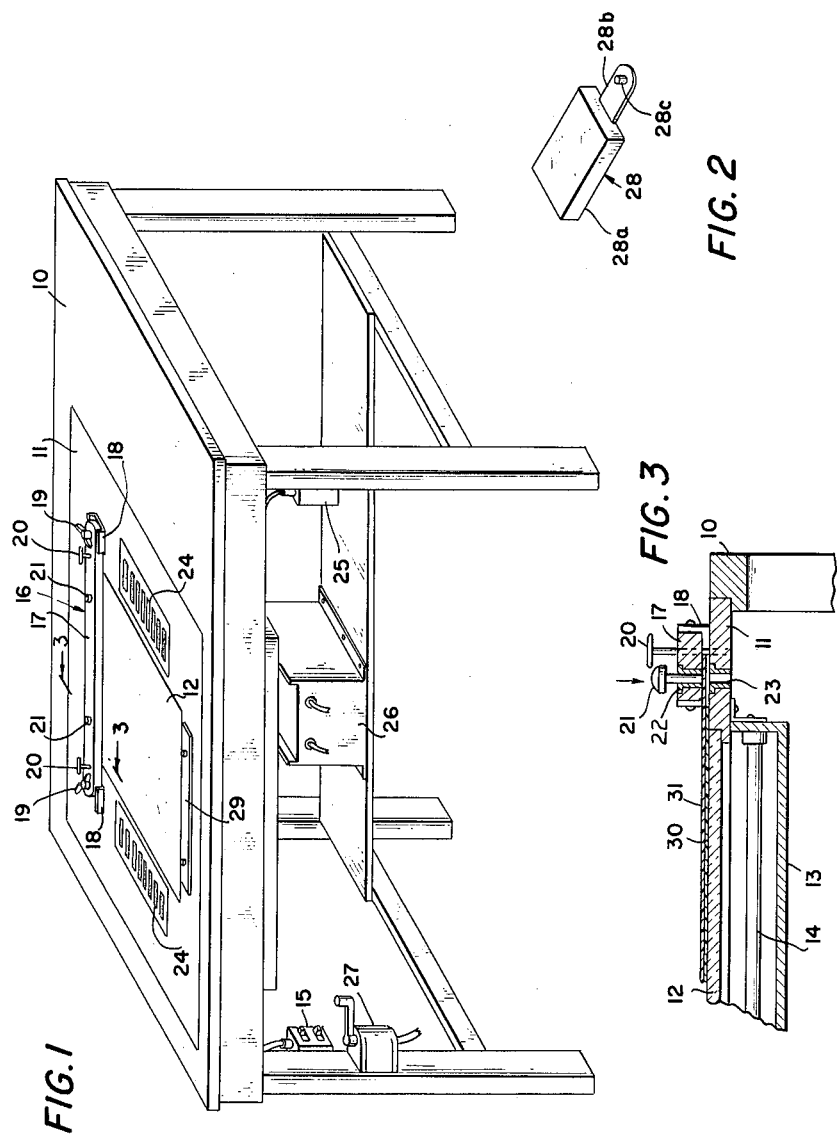

United States Patent Office 3,198,047
Patented Aug. 3, 1965

3,198,047
APPARATUS AND METHOD FOR POSITIONING A SHEET OR FILM AND IMPOSING REGISTERING MEANS THEREIN
William Munz, Berkeley Heights, N.J., assignor to Publication Corporation, New York, N.Y., a corporation of New York
Filed Aug. 20, 1962, Ser. No. 217,902
12 Claims. (Cl. 83—33)

This invention relates to a novel apparatus and method for positioning a sheet or film relative to a surface and for imposing in the sheet or film means to facilitate its registration.

More specifically, in the present invention provision is made for locating a photographic film relative to a master layout and relative to a device for imposing registering means in the photographic film with the aid of magnetically locked film-positioning elements. When the film is thus registered, the said device is operated to impose the registering means in the film. Once the film-positioning elements are fixed magnetically and locked in place they serve to facilitate the registration of other similar photographic films in which similar registering means are to be imposed. The photographic films in which the registration means is thus imposed are readily registered with respect to other photographic films containing similar registering means.

One practical application of the present invention relates to the preparation of printing surfaces for color printing in a rotogravure printing press. The subject to be printed in color is first photographed through filters to produce separation negatives, one for each color. A positive of the separation negative is then made by contact printing during which it is customary to punch the positive to facilitate registration between the separation negatives and the positives made therefrom. The present invention utilizes the punched holes in the positive to facilitate positioning it relative to a master layout and at least two other punches. The positioning of the positive is facilitated by film-positioning elements which carry means to engage the initial punch holes in the film and to fix the registered position of the film relative to the master layout. When proper registration between the film and the master layout is obtained, the film-positioning elements are magnetically clamped in their adjusted positions to maintain the film in its registered position. Once the film-positioning elements are thus magnetically locked in position, similarly pre-punched positives can be quickly registered with respect to the master layout and punched one at a time or several at a time by the punches. The punched positives can subsequently be readily registered with respect to the pre-punched unexposed film during contact exposure to produce the negative etching resist film used in the preparation of the printing surface.

Although the foregoing example illustrates one practical application of the present invention, the present invention is not limited to this or any particular application.

For a more complete understanding of the present invention, reference can be made to the detailed description which follows, and to the accompaanying drawings, in which:

FIGURE 1 is an isometric view of the film-positioning and punching apparatus of the present invention;

FIGURE 2 is an isometric view of one of the film-posiing elements used in conjunction with the apparatus;

FIGURE 3 is a sectional view taken along the line 3—3 of FIGURE 1, looking in the direction of the arrows;

Figure 4:
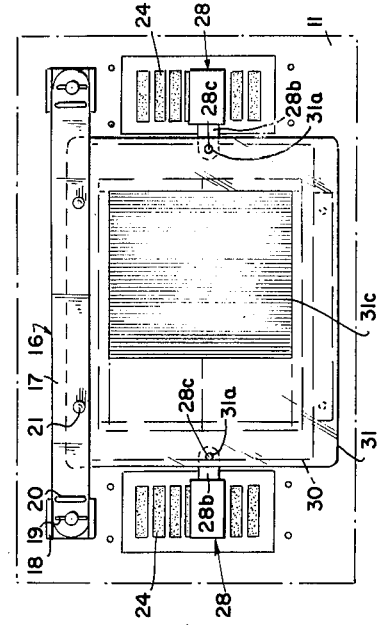
FIGURE 4 is a plan view of part of the apparatus shown in FIGURE 1 with a transparent master layout in registered position.

Referring to FIGURE 1 of the drawings, the film-positioning and punching apparatus of the present invention is supported on top of a table 10. The top of the table has secured thereto a platen 11 which has a central window therein accommodating a translucent glass plate 12. The glass plate 12 covers a light box 13 (see FIGURE 3) recessed within the top of the table. The light box contains one or more fluorescent lights 14 which are illuminated by the actuation of a switch box 15 affixed to one leg of the table. The light box illuminates the area defined by the glass plate 12.

A punching device, generally designated 16, is mounted above the platen adjacent the illuminated area on the far side from the operator. The punching device, as shown, includes a bar 17 which extends beyond the side edges of the illuminated area and a pair of bar supports 18 at both ends which support the bar 17 above and out of contact with the upper surface of the platen 11. The bar 17 and the supports 18 are affixed to the platen 11 by wing screws 19. Just inside the bar supports 18 and the wing screws 19, the bar 17 is provided with a pair of holes which accommodate T-shaped positioning pins 20. The lower ends of the pins 20 engage aligned holes in the platen 11 and facilitate positioning the bar 17 before the wing screws 19 are inserted.

Figure 8:
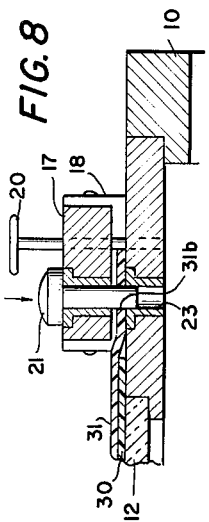
FIGURE 8 is an enlarged sectional view similar to FIGURE 3 illustrating the operation of the punch.

The punching bar 17 supports two punching elements 21 spaced apart therein. As best shown in FIGURE 3, the punching elements 21 are each guided for vertical movement within a bushing 22 directly above and in alignment with a punching die 23. When the enlarged head of each punching element is displaced downwardly, as shown in FIGURE 8, such as by striking it with a hammer, the punch enters the corresponding lower die and passes through any film or films between the punch and the die. It should, of course, be understood that the punching elements are shown in fairly crude form for purposes of illustration only, and in a commerical embodiment of the apparatus, they would be arranged to be operated in unison through a handle similar to the punching mechanism described in the copending application of John F. Nappy, Serial No. 132,054, filed August 17, 1961 now Patent No. 3,148,584. However, the punching elements as shown and described herein are adequate to illustrate the present invention.

On both sides of the illuminated area the platen accommodates a magnetic chuck 24 containing electrical windings which, when energized, magnetize the upper surfaces of the chucks 24. The flow of electrical current through the energized windings is controlled by a switch 25 (see FIGURE 1). The electric switch 25 supplies current to a rectifier 26 supported on a shelf beneath the table, and the rectifier converts the A.C. input current to a D.C. output which, in turn, can be regulated by a manually controlled rheostat 27 to control the magnetization of the chucks 24.

The magnetized chucks 24 lock film-positioning elements 28 (see FIGURE 2) thereto. These film-positioning elements each include a magnetic block 28a having an arm 28b extending therefrom and an upwardly projecting lug or pin 28c carried by the arm 28b.

Figure 5:
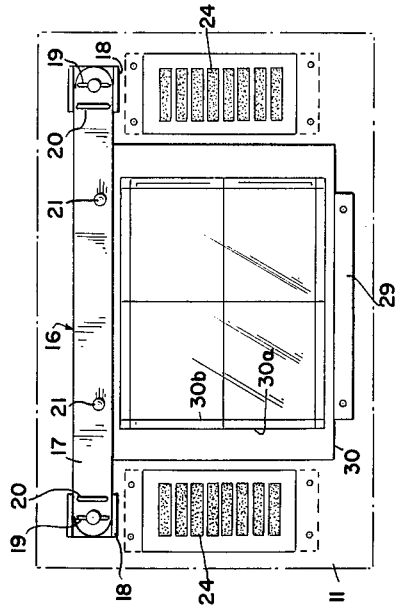
FIGURE 5 is a view similar to FIGURE 4 showing a photographic film and two film-positioning elements before the film is properly registered with respect to the master layout.

Directly beneath the illuminated area a relatively flat registering bar 29 is affixed to the platen 11. The edge of the bar 29 adjacent the window 12 serves to register a master layout film 30 as shown in FIGURE 4. The master layout film 30 is a transparent film which is preferably affixed, such as by a pressure-sensitive tape, to the top of the platen in a position above the translucent window 12. The master layout film has reference lines or margins, such as those designated 30a and 30b in FIGURE 4, which determine references for positioning another photographic film, such as a positive film 31 shown in FIGURE 5.

Figure 6:
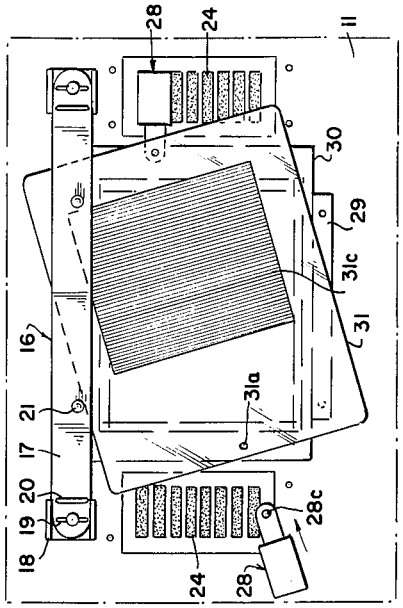
FIGURE 6 is a view similar to FIGURE 5, showing the photographic film in registered position with respect to the master layout and the film-positioning elements magnetically locked in place.
Figure 7:
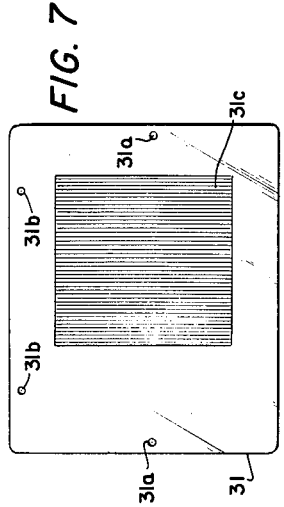
FIGURE 7 is a view of the punched film.

The use of the film-positioning and punching apparatus described above can be best illustrated in FIGURES 4 through 6 of the drawings. By way of background, in the preparation of printing surfaces for multicolor rotogravure printing, a plurality of color filtered separation negatives are initially made of the subject to be printed in color. A positive, such as the positive 31 shown in FIGURE 7, is then made from each of the filtered negatives, and at the time the positive is made reference holes 31a are punched therein to facilitate registering the filtered negatives and the positives made therefrom. The holes 31a can be punched at random or in any of a variety of different positions depending on the particular vacuum frame or punching means employed. In the film-positioning and punching apparatus of the present invention, these punched holes 31a in the film are used to register and position one or a plurality of positives relative to the master layout film 30 and then to punch holes 31b therein which can be used to register the positives relative to pre-punched unexposed film which is exposed in contact with the positive to make the negative etching resist films corresponding to each positive. These negative etching resist films are, in turn, used in a manner well known to those skilled in the art of the preparation of the printing plates.

Toward this end, the master layout film 30 is initially fixed on top of the platen in a position such that the outer margin 30a of the master layout represents the printing area of the printing plate. The positive image-bearing film 31, pre-punched to produce the holes 31a therein, is then oriented and adjusted relative to the master layout by positioning the positive image 30c thereof to the desired position relative to the inner margin 30b, as shown in FIGURE 6. When the film 31 is positioned to the desired position, one edge thereof outside the image-bearing portion will be interposed between the bar 17 of the punching mechanism and the upper surface of the platen. The film-positioning elements 28 are then placed on the magnetic chucks 24 and adjusted so that the upstanding pins or lugs 28c thereof engage the pre-punched holes 31a in the film. The switch 25 is then actuated, energizing the magnetic chucks 24 and locking the film-positioning elements 28 thereto. The punches 21 are then actuated to produce the punch holes 31b in the positive film 31 which are employed in the manner described above to register the positive with a pre-punched unexposed film before making a contact exposure to produce the negative etching resist film.

Once the film-positioning elements 28 are magnetically locked to the upper surfaces of the electromagnetic chucks 24, all of the positives similarly pre-punched with the holes 31a can be quickly registered with respect to the master layout film 30 and the punching elements 21 by simply inserting the pre-punched holes 31a on the upstanding pins or lugs 28c of the film-positioning elements 28 with the appropriate edge beneath the bar 17. Thus, for example, a plurality of such positives can be thus registered and punched to provide the punch holes 31b therein in a single punching operation.

It is apparent that it is immaterial that the initial punch holes 31a are at opposite edges in the film 31. For example, both punch holes 31a could be at the same edge of the film in which case both of the film-positioning elements would be magnetically locked to the same electromagnetic chuck 24.

The invention has been shown and described in a single preferred form and by way of example, and obviously, many modifications and variations can be made therein without departing from the spirit of the invention. The invention, therefore, is not to be limited to any specific form or embodiment, except insofar as such limitations are expressly set forth in the appended claims.

I claim:

1. A method of registering and punching a pre-punched photographic film comprising the steps of registering the photographic film on a surface relative to a master layout and a punching means mounted in fixed position relative to said surface, positioning at least two film-positioning elements, each carrying upstanding registering means engageable with the initial punch holes in the film, relative to said surface with said means carried thereby in engagement with different punch holes in the film, magnetically clamping said film-positioning elements in their adjusted positions and actuating the punching means to produce additional punch holes in the film.

2. A method of registering and punching a pre-punched photographic film as set forth in claim 1 including the steps of registering additional photographic films pre-punched in the same manner as the aforesaid photographic film by positioning each photographic film on the said surface and orienting it so that the initial punch holes are engaged by the means carried by the film-positioning elements still magnetically locked in their adjusted positions, and punching each film so registered.

3. A method as set forth in claim 1 in which the film-positioning elements are electromagnetically clamped in their adjusted positions.

4. A positioning and punching apparatus for registering and punching a pre-punched photographic film comprising a registering surface having a master layout thereon, punching means mounted in fixed position relative to said surface, at least two film-positioning elements, each carrying means engageable with the initial punch holes in the film, a magnetizable surface adjacent the registering surface, and magnetic means for clamping the film elements on said magnetizable surface in adjusted positions relative to the master layout with the means carried thereby in engagement with the initial punch holes in the film, whereby the pre-punched photographic film can be punched to facilitate subsequent handling and the magnetically clamped film-positioning elements can be used for registering another similarly pre-punched photographic film relative to the said punching means.

5. An apparatus as set forth in claim 4 in which the magnetic means is electromagnetic means which, when energized, locks the film-positioning elements against movement.

6. A positioning and punching apparatus for a pre-punched photographic film comprising a registering surface for receiving a master layout thereon and on which the photographic film is to be registered, film-punching means in fixed position relative to said registering surface and overlying an edge of a photographic film properly registered with respect to the master layout to produce a registering punch in said film, a magnetizable surface adjacent said registering surface, a film-positioning element adjustable on said magnetizable surface and including upstanding means engageable with an initial punch in said film, and electromagnetic means energizable to clamp said film-positioning element in an adjusted position on said magnetizable surface to fix the registered position of said film.

7. A positioning and punching apparatus as set forth in claim 6 including means for illuminating said registering surface beneath the registered film.

8. A positioning and punching apparatus as set forth in claim 6 in which the punching means includes a bar supported at both ends above said surface and at least two vertically movable punching elements carried by said bar and including a punching die adjacent said registering surface in alignment with each of said punching elements.

9. A positioning and punching apparatus for a pre-punched photographic film comprising a surface for receiving a master layout thereon and on which the photographic film is to be registered, film-punching means in fixed position relative to said surface and overlying an edge of the photographic film in properly registered position with respect to the master layout to permit the latter to make a registering punch in said film, a magnetizable surface adjacent at least one other edge of a film in properly registered position, at least one film-positioning means which can be bodily lifted and oriented when it is not electromagnetically clamped to said magnetizable surface, and electromagnetic means energizable to clamp said film-positioning means on said magnetizable surface, said film-positioning means including a magnetizable block adapted to be clamped to said magnetizable surface when the electromagnetic means is energized, an arm extending from the base of the block and upwardly projecting registering means carried by the arm and engageable with a punch in the pre-punched film to register the pre-punched film relative to the film-punching means.

10. A positioning and punching apparatus as set forth in claim 9 including at least two film-positioning means as therein defined.

11. A positioning and punching apparatus as set forth in claim 9 in which the film-punching means includes at least two spaced-apart punches.

12. A positioning and punching apparatus for a pre-punched photographic film comprising a surface on which said photographic film is to be registered relative to a master layout affixed to said surface, a translucent window forming part of said surface, a light box beneath said translucent window, film-punching means supported above said surface adjacent one side of said translucent window, energizable electromagnetic chuck means adjacent at least one other side of said window, and at least one film-positioning element adapted to be magnetically clamped on said electromagnetic chuck means when the latter is energized, said film-positioning element including a magnetizable block adapted to be clamped to said electromagnetic chuck means when the latter is energized, a relatively flat arm extending from the base of the block and upwardly projecting registering means carried by the arm and engageable with a punch in the pre-punched film.

References Cited by the Examiner

UNITED STATES PATENTS

| 1,761,863 | 6/30 | Bassist | 33—184.5 |
| 1,828,791 | 10/31 | Thompson | 269—8 X |
| 1,962,431 | 6/34 | Daley | 83—33 |
| 2,131,359 | 9/38 | Seffqig | 83—33 |
| 2,477,297 | 7/49 | Giles et al. | 317—162 X |
| 2,613,744 | 10/52 | Hillmer | 83—520 |
| 2,690,219 | 9/54 | Feiertag | 83—451 X |
| 2,692,433 | 10/54 | Perna | 83—184.5 X |
| 2,696,867 | 12/54 | Wensink | 33—184.5 X |
| 2,738,009 | 3/56 | Jones | 83—467 |
| 2,768,686 | 10/56 | Feiertag | 83—451 X |
| 2,776,712 | 1/57 | Carlson | 83—467 |
| 3,105,330 | 10/63 | Grage | 317—159 |

ANDREW R. JUHASZ, *Primary Examiner.*

WILLIAM W. DYER, JR., *Examiner.*